Feb. 19, 1929.
G. A. BARTHOLOMEW
1,702,858
HUMIDIFIER FOR INTERNAL COMBUSTION ENGINES
Filed Dec. 2, 1927
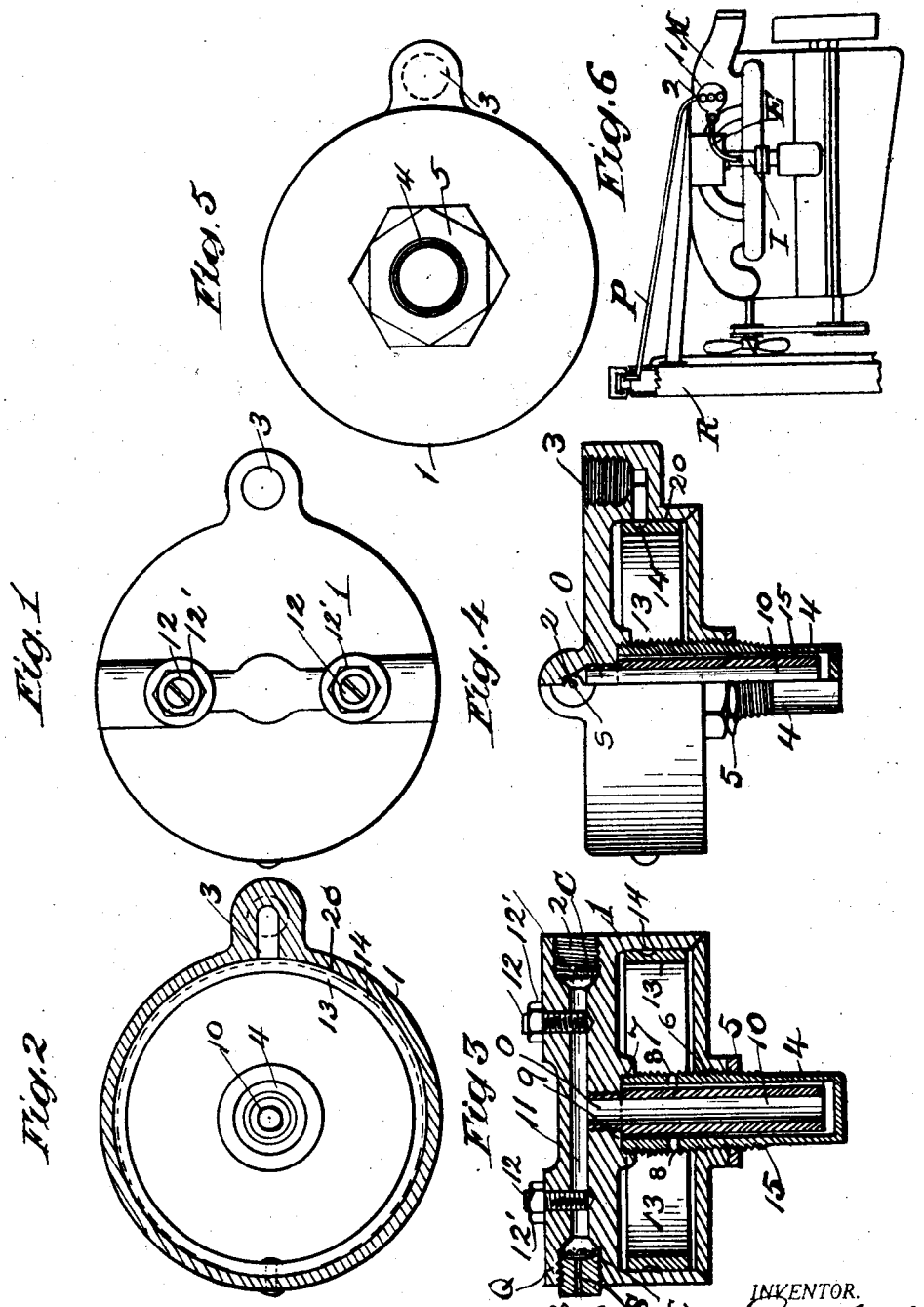
INVENTOR.
Gilbert A. Bartholomew
BY
Wm. M. Monroe
ATTORNEY.

Patented Feb. 19, 1929.

1,702,858

UNITED STATES PATENT OFFICE.

GILBERT A. BARTHOLOMEW, OF CLEVELAND, OHIO.

HUMIDIFIER FOR INTERNAL-COMBUSTION ENGINES.

Application filed December 2, 1927. Serial No. 237,130.

The invention relates to humidifiers for attachment to the intake passage of a combustion engine, by means of which steam may be added to the charge, to cool the same, to prevent detonation, and to assist in eliminating carbon formation, and to produce a smoother running engine.

The invention includes the provision of a hollow cylindrical body or chamber having its walls constructed of bronze or other metal which will expand when heated.

This chamber is attached to the exhaust manifold of the engine and has a portion inserted therein, thereby acquiring progressively the rising degrees of temperature of the exhaust as the engine gains in speed when in use.

This chamber communicates on one side with the radiator top or other source of steam and upon the other side with the intake manifold of the engine between the carburetor and cylinders, in such a manner that when all parts are open, super-heated steam from the radiator will be drawn into the intake manifold of the engine.

When the engine is cold as when starting it would not be desirable to introduce steam into the explosive mixture, and as the engine speeds up the steam superheated by its passage through a chamber in which it is spread over a specially provided heating surface is progressively supplied at the intake manifold in the proportions most essential to increase the power of the fuel and speed of the engine.

This result is accomplished by means of a relatively stationary ring positioned within the cylindrical chamber and formed of material which has a lower ratio of expansibility than that of the cylinder and which normally closes the suction or outlet port in the wall of the aforesaid chamber leading to the intake manifold but which is gradually separated therefrom by the expansion of the wall of the aforesaid outer chamber due to the increased temperature thereof to permit superheated steam to pass into the intake manifold in gradually increasing quantities as the engine and exhaust temperature rises.

The invention is hereinafter further described, illustrated in the accompanying drawings and specifically pointed out in the claims.

Fig. 1 is a plan of the device.

Fig. 2, is a horizontal section.

Figs. 3, and 4 are vertical sections.

Fig. 5, is a bottom plan.

Fig. 6, is a side elevation of an internal combustion engine showing the power augmenting device attached thereto.

Here 1 is a cylindrical chamber formed of two portions and constructed of a highly expansible metal such as bronze or brass and communicating at 2 with the radiator of a water cooled explosion engine or other source of steam, and at 3 with the intake manifold I of the engine. At 4 is shown a hollow extension which enters the exhaust manifold M of the engine, and communicates the progressive temperatures thereof to the chamber walls.

This extension may be constructed of steel or other heat resisting material and the joint is made gas tight by means of a clamping nut 5.

This tubular extension is attached by screwing it into the lower wall of the chamber at 6 and also into the upper wall at 7, thus securing it firmly in place.

This tubular extension is also perforated laterally at 8, 8, and is provided with an open upper end at 0.

A central tube 10 of smaller diameter to provide a passage between these parts is inserted into the upper wall of the chamber and communicates at its upper end with steam or air intake passage 11, and extends downwardly nearly to the lower end of said hollow extension.

Adjusting screws 12 and 12 in the steam or air admission passage control the admission of steam or air to the chamber and are locked by nuts 12', 12'.

A concentric ring 13 is secured in the hollow chamber 1 and normally closes the outlet port 3 leading to the intake manifold I of the engine as shown in Figs. 3 and 4.

This ring is constructed of a less expansible metal than the walls of the outer chamber and hence when the outer wall is expanded a space 15, will be formed between the walls of the chamber and ring through which the steam superheated by spreading it over the tube in the hollow extension will readily pass.

This space becomes greater as the engine temperature rises.

The ring is preferably secured by riveting to the wall of the chamber 1 directly opposite to the outlet port.

And a preferably accentric groove 14 may be formed in the vertical face of the ring or chamber wall to give a greater facility to the flow of the steam towards the outlet port 3.

By attaching the ring at one side of the chamber the width of the space at 20 is increased, and the flow of steam will be more rapid owing to the reduced amount of friction thereupon.

When in use, the piping P connecting the intake opening 2 with the radiator R, is attached upon the side most convenient to the radiator, and the other opening is closed by a plug Q, having an air admission opening S therein, through which more or less air can be drawn when desired, a strainer cloth C prevents sediment from reaching the chamber, the plug holds the strainer in place, a pipe E connects the outlet with the intake 1.

Having described the invention, what I claim as new and desire to secure by Letters Patent is, In a thermally operated humidifying device for an internal combustion engine attachable to the exhaust manifold of said engines, a main hollow chamber having its walls formed from highly expansible metal having an outlet port in one side, an annular metal valve in said chamber and normally closing said port until said chamber wall is expanded, said main chamber being provided with a vertically projecting tubular chamber passing therethrough and closed at both ends, and having lateral outlet ports in its sides communicating with said main chamber, a central tube passing into said tubular chamber, and a transverse passage for steam and air above said main hollow chamber and communicating with said central tube, and separate valves for controlling the passage of steam and air into said transverse passage.

In testimony whereof I affix my signature.

GILBERT A. BARTHOLOMEW.